US008328625B1

(12) United States Patent
Antkowiak et al.

(10) Patent No.: US 8,328,625 B1
(45) Date of Patent: Dec. 11, 2012

(54) WAGERING GAME MACHINE WITH A TYPE DRIVEN INTERFACE

(75) Inventors: Ryan Antkowiak, Chicago, IL (US); Kevin Kahley, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 1398 days.

(21) Appl. No.: 11/937,619

(22) Filed: Nov. 9, 2007

Related U.S. Application Data

(60) Provisional application No. 60/865,444, filed on Nov. 12, 2006.

(51) Int. Cl.
*A63F 13/00* (2006.01)

(52) U.S. Cl. ................ 463/25; 463/20; 463/40; 463/42; 705/51; 705/59

(58) Field of Classification Search .................... 463/20, 463/25, 42, 40; 705/51, 59
See application file for complete search history.

(56) References Cited

U.S. PATENT DOCUMENTS 7,297,062 B2 * 11/2007 Gatto et al. .................... 463/42
7,628,691 B2 * 12/2009 Luciano et al. ................ 463/18
7,819,742 B2 * 10/2010 Chamberlain et al. .......... 463/25
7,970,652 B1 * 6/2011 Woolston .................... 705/26.1
2001/0053712 A1 * 12/2001 Yoseloff et al. .................. 463/1
2008/0026822 A1 * 1/2008 Walker et al. .................. 463/25
2010/0075746 A1 * 3/2010 Anderson et al. .............. 463/25
2010/0317442 A1 * 12/2010 Thomas et al. ................ 463/42
2011/0014964 A1 * 1/2011 Crowder et al. ............... 463/13

* cited by examiner

*Primary Examiner* — Pierre Eddy Elisca
*Assistant Examiner* — Shahid Kamal
(74) *Attorney, Agent, or Firm* — Schwegman Lundberg & Woessner, P.A.

(57) ABSTRACT

Systems and methods provide a type driven interface for a wagering game machine. One aspect of the systems and methods includes providing a game framework including a game library manager that manages creation, update and deletion of multiple wagering games on a gaming machine.

15 Claims, 9 Drawing Sheets

```
struct Begin
{
  typedef void ReturnType;
  typedef boost::function<void (void)> TCallback;
  Begin(){}
  Begin(const TCallback & _cb) : cb(_cb){}
  TCallback cb;
};
```

300

FIG. 3A

```
struct End
{
  typedef void ReturnType;
  typedef boost::function<void (void)> TCallback;
  End(){}
  End(const TCallback & _cb) : cb(_cb){}
  TCallback cb;
};
```

350

FIG. 3B

400

```
class CClientManager {

   template <typename T>

   void Register(T type);

private:

   Handlers handlers;

};
```

FIG. 4

500

```
class CClientManager {

   template <typename T>

   void Register(T type);

private:

   template <typename T>

   T::ReturnType Execute()

   Handlers handlers;

};
```

FIG. 5

WAGERING GAME MACHINE WITH A TYPE DRIVEN INTERFACE

RELATED APPLICATION

This application claims priority under 35 U.S.C. 119(e) from U.S. Provisional Application Ser. No. 60/865,444 filed Nov. 12, 2006, which application is incorporated herein by reference.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2006, 2007, WMS Gaming, Inc.

FIELD

The present invention relates generally to software for wagering gaming machines, and more particularly to providing a type driven interface for a wagering gaming machine.

BACKGROUND

Today's gaming machine typically comprises a computerized system controlling a video display or reels that provide wagering games such as slots, video card games (poker, blackjack etc.), video keno, video bingo, video pachinko and other games typical in the gaming industry. In order to prevent players from becoming bored, new versions of wagering games, and alterations to existing games are constantly being developed.

In past systems, the software controlling the computerized system has been primarily proprietary software, including both the operating system and gaming software. Additionally, in previous systems the gaming terminal software has been provided as a single monolithic system. That is, all of the software is built and provided as a single product or unit, typically on a persistent storage device such as a flash memory, a compact flash memory, EEPROM or a hard disk.

This manner of providing gaming software can lead to several problems. A first problem concerns updating games or game features on a gaming machine. In previous systems, every time a new game is released, a technician must go to the gaming machine, unlock and open the gaming machine, remove the old persistent storage media and replace the old media with new media containing the new or updated game. During this time, the gaming machine is unavailable for use, resulting in a loss of revenue for the gaming establishment.

Alternatively, wagering game software may be downloaded to a wagering game machine. Typically the downloaded software components utilizes tightly coupled interfaces. As a result, if an interface changes, all of the components utilizing the interface must typically be recompiled and downloaded to the wagering game machine.

BRIEF DESCRIPTION OF THE DRAWINGS

Embodiments of the invention are illustrated by way of example and not limitation in the Figures of the accompanying drawings in which:

FIGS. 3A and 3B describe data structures for defining an example type according to embodiments of the invention.

FIG. 4 describes a data structure for registering a type according to embodiments of the invention.

FIG. 5 describes a data structure for executing a callback function according to embodiments of the invention.

DETAILED DESCRIPTION

Figure 1:
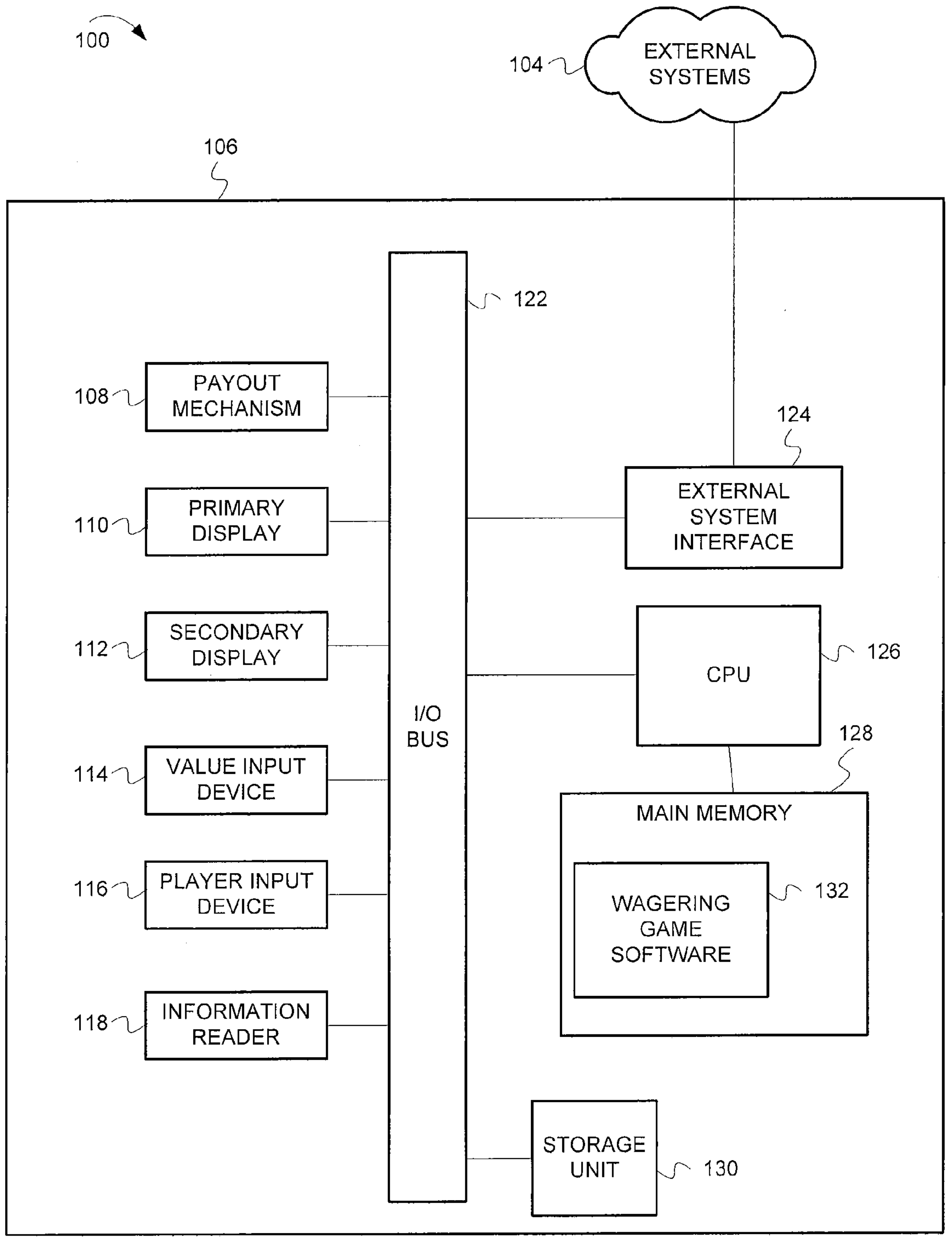
FIG. 1 is a block diagram of an architecture, including a control system suitable for a wagering game machine.

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The description of the various embodiments is to be construed as exemplary only and does not describe every possible instance of the invention. Numerous alternatives could be implemented, using combinations of current or future technologies, which would still fall within the scope of the claims. The following detailed description is, therefore, not to be taken in a limiting sense, and the scope of the present invention is defined only by the appended claims.

Example Operating Environment

FIG. 1 is a block diagram illustrating a wagering game machine architecture, including a control system, according to example embodiments of the invention. As shown in FIG. 1, the wagering game machine 106 includes a central processing unit (CPU) 126 connected to main memory 128, which may store wagering game software 132. In one embodiment, the wagering game software can include software associated with presenting wagering games, such as video poker, video black jack, video slots, video lottery, etc., in whole or part. In addition, wagering game software 132 may include bonus rounds, themes, advertising content, attract mode content, pay tables, denomination tables, audio files, video files, operating system files and other software associated with a wagering game or the operation of a wagering game machine.

The CPU 126 is also connected to an input/output (I/O) bus 122, which facilitates communication between the wagering game machine's components. The I/O bus 122 is connected to a payout mechanism 108, primary display 110, secondary display 112, value input device 114, player input device 116, information reader 118, and storage unit 130. The player input device 116 can include the value input device 114 to the extent the player input device 116 is used to place wagers. The I/O bus 122 is also connected to an external system interface 124, which is connected to external systems 104 (e.g., wagering game networks).

Figure 7:
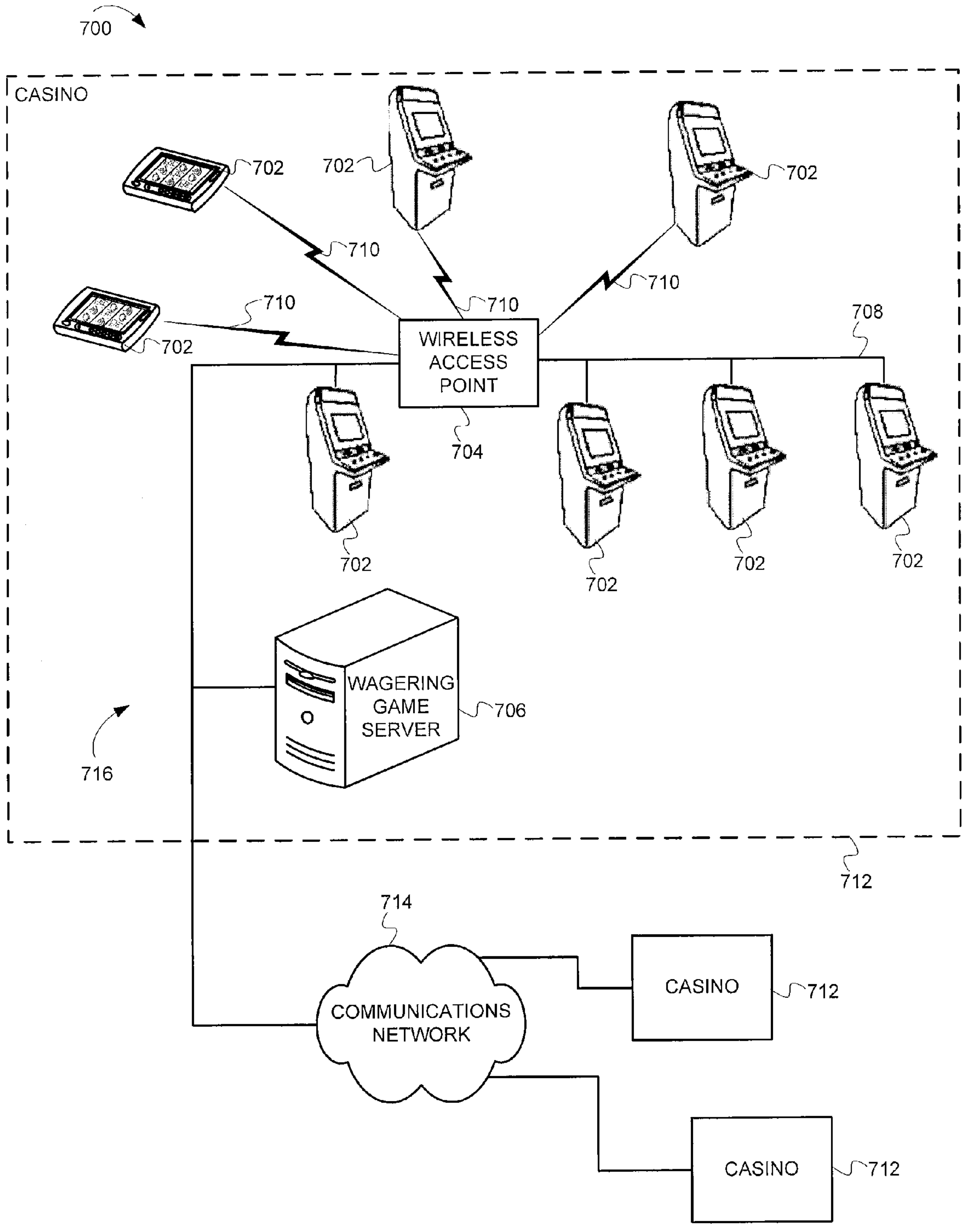
FIG. 7 is a diagram illustrating a wagering game network according to embodiments of the invention.

Wagering game software 132 may be loaded from storage unit 130, or it may be loaded from external systems 104 such as servers of other systems on a wagering game network (illustrated further in FIG. 7).

In one embodiment, the wagering game machine 106 can include additional peripheral devices and/or more than one of each component shown in FIG. 1. For example, the peripherals may include a bill validator, a printer, a coin hopper, a button panel, or any of the many peripherals now found in wagering game machines or developed in the future. Further, in some embodiments, the wagering game machine 106 can include multiple external system interfaces 124 and multiple CPUs 126. In one embodiment, any of the components can be integrated or subdivided. Additionally, in one embodiment, the components of the wagering game machine 106 can be interconnected according to any suitable interconnection architecture (e.g., directly connected, hypercube, etc.).

Figure 2:
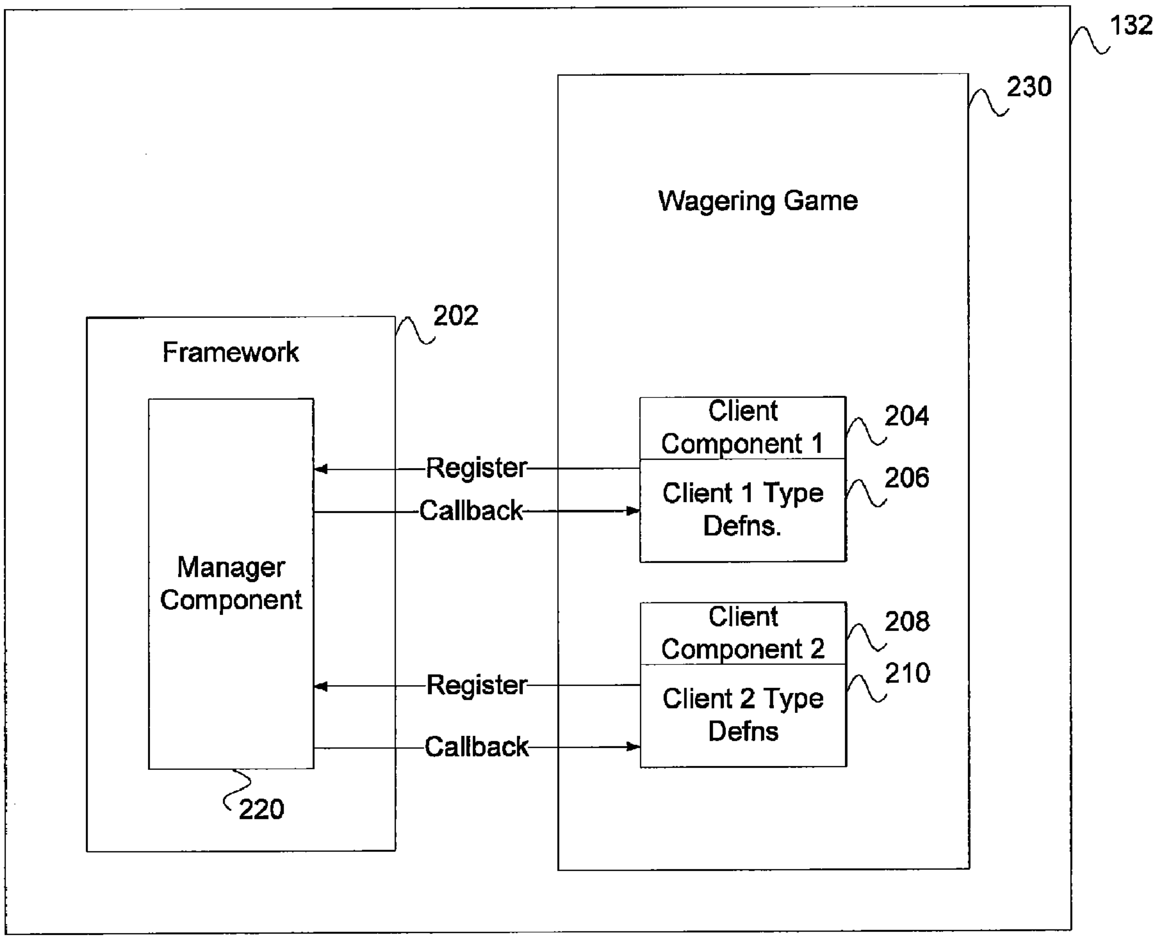
FIG. 2 is a block diagram of a software environment for a gaming machine including a game framework and gaming subsystem used in varying embodiments of the invention.

FIG. 2 is a block diagram providing further details for wagering game software 132 for a wagering game machine according to various embodiments of the invention. In some embodiments, wagering game software 132 includes a wagering game 230 and a game framework 202.

Wagering game 230 may be any type of wagering game that may be presented on a wagering game machine 100. Examples include mechanical and video slots, video poker, video black jack, video lottery, etc. Wagering game 230 may use or communicate with wagering game framework 202 during the execution of the game.

In some embodiments, wagering game framework 202 includes one or more manager components 220 and one or more client components 204, 208. Components 204, 208 and 220 may provide various functionality to a wagering game 230. For example, components 204, 208 and 220 may be used to implement base wagering games, bonus games, advertising applications, download management applications, random number generators or any other type of component usable by a wagering game or wagering game machine The embodiments are not limited to any particular type of component. Additionally, a component may be organized as an application, process, thread, object code library, object code module, or any other type of executable subunit. In some embodiments, components 204, 208 or 220 may be downloaded from a game server such as server 706 (FIG. 7).

Client components such as client components 204 and 208 may include type definitions 206, 210. In the example illustrated in FIG. 2, client 204 includes code and data defining type definitions 206 and client 208 includes code and data defining type definitions 210. The type definitions defined in type definitions 208 and 210 may be entirely different from one another, entirely the same as one another, or may have some amount of overlap. During the execution of a client component, the client component registers some or all of its type definitions with a manager component 220. As part of the registration process, a callback function for the type is registered. Following registration, the manager component may cause a callback function for a particular type to be executed as needed by issuing a message for the desired type.

Further details on the type definitions and callback registration and execution are provided in FIGS. 3A, 3B, 4, 5 and 6.

FIGS. 3A and 3B are example structure definitions for defining types 300 and 350 used to define messages in a type driven interface according to example embodiments of the invention. Structure 300 defines an example "Begin" type while structure 350 defines an example "End" type. As illustrated in FIGS. 3A and 3B, the structures 300 and 350 include a callback function, a return type for the callback function. As shown in structures 300 and 350, the callback function does not take parameters and does not return a value. The callback function may be a free function or it may be a class function for an instance of a particular object. In some embodiments, a common name is used for the function and is used in function invocation.

An implementation of the "boost::function" object is available from www.boost.org. The Boost.Function library comprises a family of class templates that are function object wrappers. It shares features with function pointers in that both define a call interface (e.g., a function taking two integer arguments and returning a floating-point value) through which some implementation can be called, and the implementation that is invoked may change throughout the course of the program. Generally, any place where a function pointer would be used to defer a call or make a callback, a Boost.Function can be used instead to allow the designer greater flexibility in the implementation of the target. Targets can be any 'compatible' function object (or function pointer), meaning that the arguments to the interface designated by Boost.Function can be converted to the arguments of the target function object.

Some embodiments maintain a list of supported interfaces. An example C++ definition for such a list is as follows:

Typedef TypeList <Begin, End> SupportedTypes;

Type lists of the form used above are defined in the Alexandrescu, Andrei "Modern C++ Design".

Further, a runtime container object (labeled "Handlers") for callback containers used in some embodiments may be defined as follows:

Typedef boost::tuple<Begin, End> Handlers;

A Boost tuple type is an instantiation of a tuple template. The template parameters specify the types of the tuple elements. The data element can be any C++ type. An implementation of the Boost tuple type is available at www.boost.org.

FIG. 4 illustrates an example class definition 400 that may be used for registering callback functions. In some embodiments, the class provides a templated registration function that determines an appropriate handler entry to updated based on the type of the instantiated registration function. Each type may be registered individually. As a result, the implementation of the messages types and callback functions may be decoupled. The types can therefore be handled by different entities, and the implementation may be dynamically changed without the need for recompiling manager components.

FIG. 5 illustrates an example class definition 500 that may be used for callback function execution. In order to execute the callback function, all the manager needs to know is the type of the message associated with the callback function. Using the message type information, the system chooses the appropriate entry in an object containing function holding structures, using the common name for the function object.

The data structures illustrated in FIGS. 3A, 3B, 4 and 5 are defines using the C++ programming language. It should be noted that the embodiments of the invention are not limited to the C++ language, and that other programming languages may be used to implement a type driven interface for wagering game machines. Further, the embodiments are not limited to the attribute and method names used in the example data structures described above.

Figure 6:
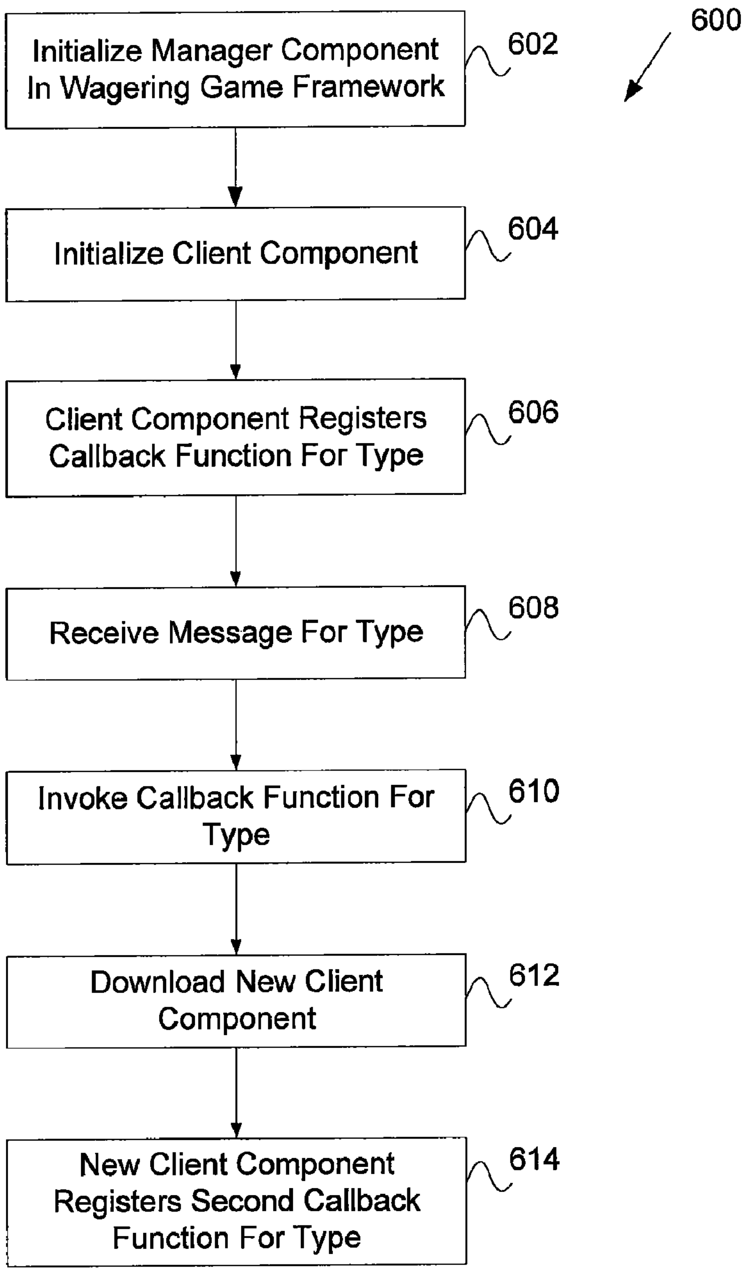
FIG. 6 is a flowchart illustrating a method for providing a type driven interface according to various embodiments of the invention.

FIG. 6 is a flowchart illustrating a method for providing a type driven interface according to various embodiments of the invention. In some embodiments, the method begins at block 602 by initializing a manager component in a wagering game framework. The manager component may manage various services provided for wagering game applications.

At block 604 a client component is initialized. The client component may be some portion or all of a wagering game, a bonus game, an advertising application, an attract mode application, or any other executable code that may run on a wagering game machine. The client component may include one or more type definitions, where each type definition includes a callback function.

At block 606, the client component registers the callback function for a type. In some embodiments, a container of handler objects is updated to include the callback function. The entry in the container that is updated is selected based on the type.

At block 608, a message having one of the types defined by the client is received. At block 610, a callback function is selected from the container of handler objects. The selection is based on the message type. The selected callback function is then executed.

In some embodiments, at block 612 a new client component may be downloaded to a wagering game machine. The new client component may contain replacement type definitions for some or all of a previously installed client component. At block 614, the new client component registers a second callback function for a previously defined type. The new callback function will then be executed upon the receipt of a message having the appropriate type.

As may be appreciated from the discussion above, client components are not required to have a common base class as is typically the case in previous systems. The type driven interface replaces the explicit function calls of previous systems with types that contain callbacks. Clients can register callback functions for a particular type of message. As a result, in some embodiments, the manager object code does not need to link with client object code. Similarly, in some embodiments, a manager component does not require recompilation if a client component changes.

A further aspect of some embodiments is that client components may selectively register for messages. If a client component does not care about a particular message type, the client does not have to do anything.

Example Wagering Game Network

FIG. 7 is a block diagram illustrating a wagering game network, according to example embodiments of the invention. As shown in FIG. 7, the wagering game network 700 includes a plurality of casinos 712 connected to a communications network 714.

Each of the plurality of casinos 712 includes a local area network 716, which includes a wireless access point 704, wagering game machines 702, and a wagering game server 706 that can serve wagering games over the local area network 716. As such, the local area network 716 includes wireless communication links 710 and wired communication links 708. The wired and wireless communication links can employ any suitable connection technology, such as Bluetooth, 802.11, Ethernet, public switched telephone networks, SONET, etc. In one embodiment, the wagering game server 706 can serve wagering games and/or distribute content to devices located in other casinos 712 or at other locations on the communications network 714.

The wagering game machines 702 and wagering game server 706 can include hardware and machine-readable media including instructions for performing the operations described herein.

The wagering game machines 702 described herein can take any suitable form, such as floor standing models, handheld mobile units, bartop models, workstation-type console models, etc. Further, the wagering game machines 702 can be primarily dedicated for use in conducting wagering games, or can include non-dedicated devices, such as mobile phones, personal digital assistants, personal computers, etc. In one embodiment, the wagering game network 700 can include other network devices, such as accounting servers, wide area progressive servers, player tracking servers, and/or other devices suitable for use in connection with embodiments of the invention.

Example Wireless Environment

In some embodiments, the wireless access point 704 can be part of a communication station, such as wireless local area network (WLAN) communication station including a Wireless Fidelity (WiFi) communication station, or a WLAN access point (AP). In these embodiments, the wagering game machines 702 can be part of a mobile station, such as WLAN mobile station or a WiFi mobile station.

In some other embodiments, the wireless access point 704 can be part of a broadband wireless access (BWA) network communication station, such as a Worldwide Interoperability for Microwave Access (WiMax) communication station, as the wireless access point 704 can be part of almost any wireless communication device. In these embodiments, the wagering game machines 702 can be part of a BWA network communication station, such as a WiMax communication station.

In some embodiments, any of the wagering game machines 702 can part of a portable wireless communication device, such as a personal digital assistant (PDA), a laptop or portable computer with wireless communication capability, a web tablet, a wireless telephone, a wireless headset, a pager, an instant messaging device, a digital camera, a television, a medical device (e.g., a heart rate monitor, a blood pressure monitor, etc.), or other device that can receive and/or transmit information wirelessly.

In some embodiments, the wireless access point 704 and the wagering game machines 702 can communicate RF signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, but they can also be suitable to transmit and/or receive communications in accordance with other techniques and standards. In some BWA network embodiments, the wireless access point 704 and the wagering game machines 702 can communicate RF signals in accordance with the IEEE 802.16-2004 and the IEEE 802.16(e) standards for wireless metropolitan area networks (WMANs) including variations and evolutions thereof. However, they can also be suitable to transmit and/or receive communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," Can 2005 and related amendments/versions.

In some embodiments, the wireless access point 704 and the wagering game machines 702 can communicate in accordance with standards such as the Pan-European mobile system standard referred to as the Global System for Mobile Communications (GSM). In some embodiments, the wireless access point 704 and the wagering game machines 702 can also communicate in accordance with packet radio services such as the General Packet Radio Service (GPRS) packet data communication service. In some embodiments, the wireless access point 704 and the wagering game machines 702 can communicate in accordance with the Universal Mobile Telephone System (UMTS) for the next generation of GSM, which can, for example, implement communication techniques in accordance with 2.5G and third generation (3G) wireless standards (See 3GPP Technical Specification, Version 3.2.0, March 2000). In some of these embodiments, the wireless access point 704 and the wagering game machines 702 can provide packet data services (PDS) utilizing packet data protocols (PDP). In other embodiments, the wireless access point 704 and the wagering game machines 702 can communicate in accordance with other standards or other air-interfaces including interfaces compatible with the enhanced data for GSM evolution (EDGE) standards (see 3GPP Technical Specification, Version 3.2.0, March 2000).

In other embodiments, the wireless access point 704 and the wagering game machines 702 can communicate in accordance with a short-range wireless standard, such as the Bluetooth™ short-range digital communication protocol. Bluetooth™ wireless technology is a de facto standard, as well as a specification for small-form factor, low-cost, short-range radio links between mobile PCs, mobile phones and other portable devices. (Bluetooth is a trademark owned by Bluetooth SIG, Inc.) In other embodiments, the wireless access point 704 and the wagering game machines 702 can communicate in accordance with an ultra-wideband (UWB) communication technique where a carrier frequency is not used. In other embodiments, the wireless access point 704 and the wagering game machines 702 can communicate in accordance with an analog communication technique. In other embodiments, the wireless access point 704 and the wagering game machines 702 can communicate in accordance with an optical communication technique, such as the Infrared Data Association (IrDA) standard. In some embodiments, the wireless access point 704 and the wagering game machines 702 can communicate in accordance with the Home-RF standard which can be in accordance with a Home-RF Working Group (HRFWG) standard.

Example Wagering Game Machine

Figure 8:
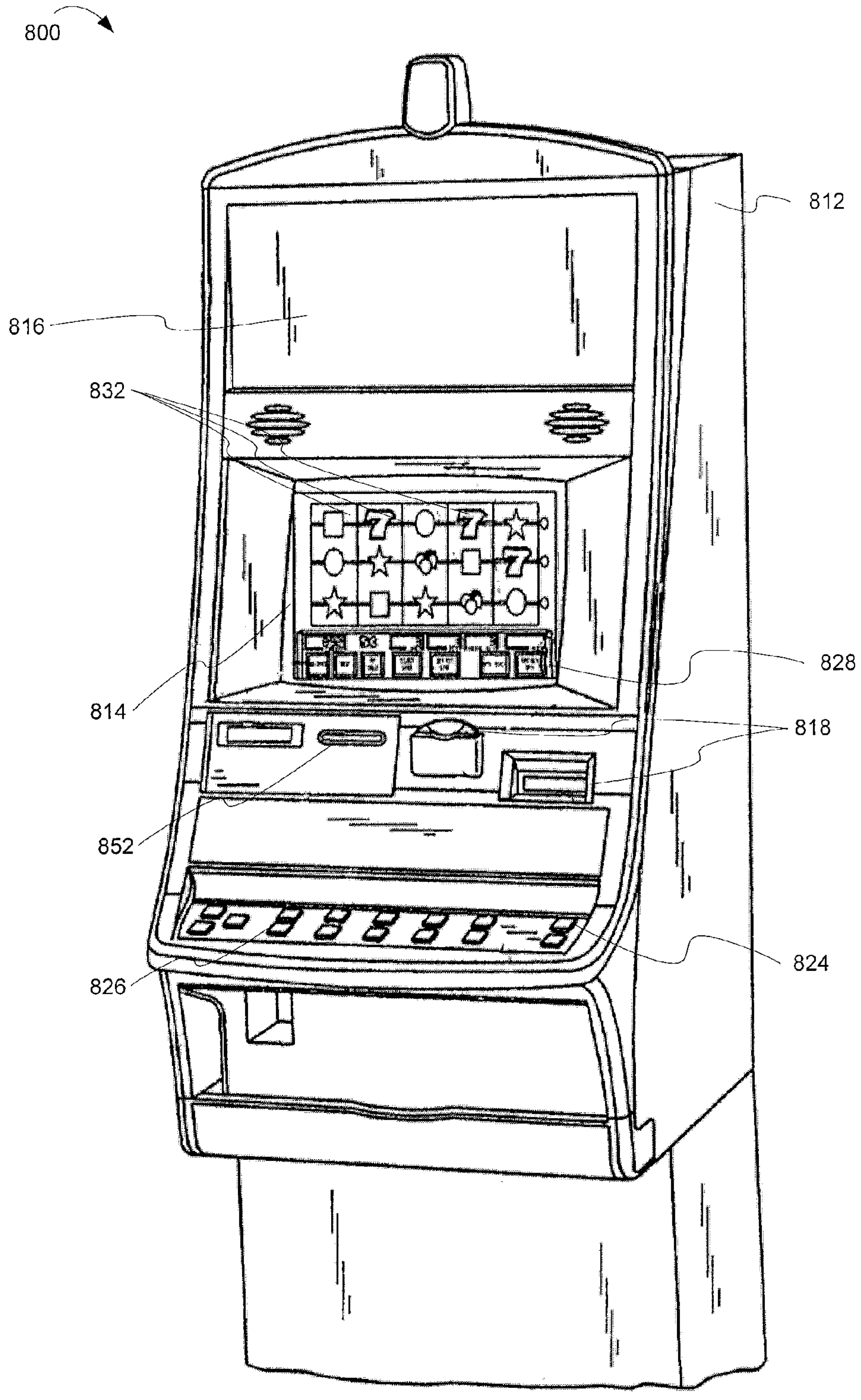
FIG. 8 is a perspective view of an example wagering game incorporating embodiments of the invention.

FIG. 8 is a perspective view of a wagering game machine, according to example embodiments of the invention. Referring to FIG. 8, a wagering game machine 800 is used in gaming establishments, such as casinos. According to embodiments, the wagering game machine 800 can be any type of wagering game machine and can have varying structures and methods of operation. For example, the wagering game machine 800 can be an electromechanical wagering game machine configured to play mechanical slots, or it can be an electronic wagering game machine configured to play video casino games, such as blackjack, slots, keno, poker, blackjack, roulette, etc.

The wagering game machine 800 comprises a housing 812 and includes input devices, including value input devices 818 and a player input device 824. For output, the wagering game machine 800 includes a primary display 814 for displaying information about a basic wagering game. The primary display 814 can also display information about a bonus wagering game and a progressive wagering game. The wagering game machine 800 also includes a secondary display 816 for displaying wagering game events, wagering game outcomes, and/or signage information. While some components of the wagering game machine 800 are described herein, numerous other elements can exist and can be used in any number or combination to create varying forms of the wagering game machine 800.

The value input devices 818 can take any suitable form and can be located on the front of the housing 812. The value input devices 818 can receive currency and/or credits inserted by a player. The value input devices 818 can include coin acceptors for receiving coin currency and bill acceptors for receiving paper currency. Furthermore, the value input devices 818 can include ticket readers or barcode scanners for reading information stored on vouchers, cards, or other tangible portable storage devices. The vouchers or cards can authorize access to central accounts, which can transfer money to the wagering game machine 800.

The player input device 824 comprises a plurality of push buttons on a button panel 826 for operating the wagering game machine 800. In addition, or alternatively, the player input device 824 can comprise a touch screen 828 mounted over the primary display 814 and/or secondary display 816.

The various components of the wagering game machine 800 can be connected directly to, or contained within, the housing 812. Alternatively, some of the wagering game machine's components can be located outside of the housing 812, while being communicatively coupled with the wagering game machine 800 using any suitable wired or wireless communication technology.

The operation of the basic wagering game can be displayed to the player on the primary display 814. The primary display 814 can also display a bonus game associated with the basic wagering game. The primary display 814 can include a cathode ray tube (CRT), a high resolution liquid crystal display (LCD), a plasma display, light emitting diodes (LEDs), or any other type of display suitable for use in the wagering game machine 800. Alternatively, the primary display 814 can include a number of mechanical reels to display the outcome. In FIG. 8, the wagering game machine 800 is an "upright" version in which the primary display 814 is oriented vertically relative to the player. Alternatively, the wagering game machine can be a "slant-top" version in which the primary display 814 is slanted at about a thirty-degree angle toward the player of the wagering game machine 800. In yet another embodiment, the wagering game machine 800 can exhibit any suitable form factor, such as a free standing model, bartop model, mobile handheld model, or workstation console model.

A player begins playing a basic wagering game by making a wager via the value input device 818. The player can initiate play by using the player input device's buttons or touch screen 828. The basic game can include arranging a plurality of symbols along a payline 832, which indicates one or more outcomes of the basic game. Such outcomes can be randomly selected in response to player input. At least one of the outcomes, which can include any variation or combination of symbols, can trigger a bonus game.

In some embodiments, the wagering game machine 800 can also include an information reader 852, which can include a card reader, ticket reader, bar code scanner, RFD transceiver, or computer readable storage medium interface. In some embodiments, the information reader 852 can be used to award complimentary services, restore game assets, track player habits, etc.

Example Wagering Game Machine

Figure 9:
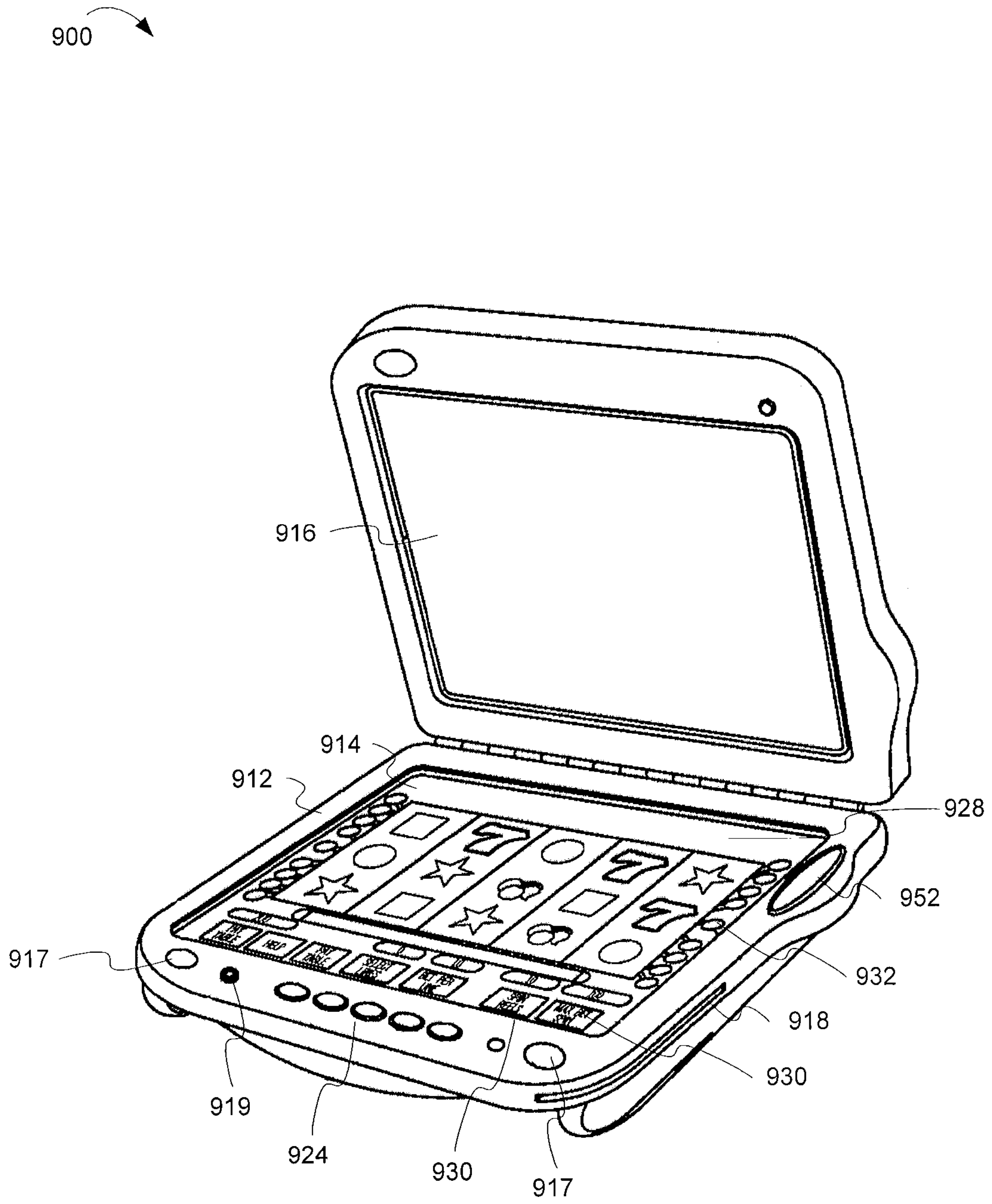
FIG. 9 is a perspective view of a portable wagering game machine incorporating embodiments of the invention.

FIG. 9 shows an example embodiment of a portable wagering game machine 910. Like free standing wagering game machines, in a handheld or mobile form, the wagering game machine 910 can include any suitable electronic device configured to play a video casino games such as blackjack, slots, keno, poker, blackjack, and roulette. The wagering game machine 910 comprises a housing 912 and includes input devices, including a value input device 918 and a player input device 924. For output, the wagering game machine 910 includes a primary display 914, a secondary display 916, one or more speakers 917, one or more player-accessible ports 919 (e.g., an audio output jack for headphones, a video headset jack, etc.), and other conventional I/O devices and ports, which may or may not be player-accessible. In the embodiment depicted in FIG. 9, the wagering game machine 910 comprises a secondary display 916 that is rotatable relative to the primary display 914. The optional secondary display 916 can be fixed, movable, and/or detachable/attachable relative to the primary display 914. Either the primary display 914 and/or secondary display 916 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 918 can comprise, for example, a slot located on the front, side, or top of the casing 912 configured to receive credit from a stored-value card (e.g., casino card, smart card, debit card, credit card, etc.) inserted by a player. The player-accessible value input device 918 can also comprise a sensor (e.g., an RF sensor) configured to sense a signal (e.g., an RF signal) output by a transmitter (e.g., an RF transmitter) carried by a player. The player-accessible value input device 918 can also or alternatively include a ticket reader, or barcode scanner, for reading information stored on a credit ticket, a card, or other tangible portable credit or funds storage device. The credit ticket or card can also authorize access to a central account, which can transfer money to the wagering game machine 910.

Still other player-accessible value input devices 918 can require the use of touch keys 930 on the touch-screen display (e.g., primary display 914 and/or secondary display 916) or player input devices 924. Upon entry of player identification information and, preferably, secondary authorization information (e.g., a password, PIN number, stored value card number, predefined key sequences, etc.), the player can be permitted to access a player's account. As one potential optional security feature, the wagering game machine 910 can be configured to permit a player to only access an account the player has specifically set up for the wagering game machine 910. Other conventional security features can also be utilized to, for example, prevent unauthorized access to a player's account, to minimize an impact of any unauthorized access to a player's account, or to prevent unauthorized access to any personal information or funds temporarily stored on the wagering game machine 910.

The player-accessible value input device 918 can itself comprise or utilize a biometric player information reader which permits the player to access available funds on a player's account, either alone or in combination with another of the aforementioned player-accessible value input devices 918. In an embodiment wherein the player-accessible value input device 918 comprises a biometric player information reader, transactions such as an input of value to the wagering game machine 910, a transfer of value from one player account or source to an account associated with the wagering game machine 910, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 918 comprising a biometric player information reader can require a confirmatory entry from another biometric player information reader 952, or from another source, such as a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 918 can be provided remotely from the wagering game machine 910.

The player input device 924 comprises a plurality of push buttons on a button panel for operating the wagering game machine 910. In addition, or alternatively, the player input device 924 can comprise a touch screen mounted to a primary display 914 and/or secondary display 916. In one aspect, the touch screen is matched to a display screen having one or more selectable touch keys 930 selectable by a user's touching of the associated area of the screen using a finger or a tool, such as a stylus pointer. A player enables a desired function either by touching the touch screen at an appropriate touch key 930 or by pressing an appropriate push button on the button panel. The touch keys 930 can be used to implement the same functions as push buttons. Alternatively, the push buttons 926 can provide inputs for one aspect of the operating the game, while the touch keys 930 can allow for input needed for another aspect of the game. The various components of the wagering game machine 910 can be connected directly to, or contained within, the casing 912, as seen in FIG. 9, or can be located outside the casing 912 and connected to the casing 912 via a variety of wired (tethered) or wireless connection methods. Thus, the wagering game machine 910 can comprise a single unit or a plurality of interconnected (e.g., wireless connections) parts which can be arranged to suit a player's preferences.

The operation of the basic wagering game on the wagering game machine 910 is displayed to the player on the primary display 914. The primary display 914 can also display the bonus game associated with the basic wagering game. The primary display 914 preferably takes the form of a high resolution LCD, a plasma display, an LED, or any other type of display suitable for use in the wagering game machine 910. The size of the primary display 914 can vary from, for example, about a 2-3" display to a 15" or 17" display. In at least some embodiments, the primary display 914 is a 7"-10" display. In one embodiment, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 914 and/or secondary display 916 can have a 16:9 aspect ratio or other aspect ratio (e.g., 4:3). The primary display 914 and/or secondary display 916 can also each have different resolutions, different color schemes, and different aspect ratios.

As with the free standing embodiments a wagering gaming machine, a player begins play of the basic wagering game on the wagering game machine 910 by making a wager (e.g., via the value input device 918 or an assignment of credits stored on the handheld gaming machine via the touch screen keys 930, player input device 924, or buttons 926) on the wagering game machine 910. In some embodiments, the basic game can comprise a plurality of symbols arranged in an array, and includes at least one payline 932 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 918 of the wagering game machine 910 can double as a player information reader 952 that allows for identification of a player by reading a card with information indicating the player's identity (e.g., reading a player's credit card, player ID card, smart card, etc.). The player information reader 952 can alternatively or also comprise a bar code scanner, RFID transceiver or computer readable storage medium interface. In one embodiment, the player information reader 952 comprises a biometric sensing device.

General

In this detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims.

Each of the embodiments described herein are contemplated as falling within the inventive subject matter, which is set forth in the following claims.

What is claimed is:

1. A wagering game machine system comprising:

at least one processor and a memory operable to present a wagering game upon which monetary value may be wagered;

a wagering game framework having at least one manager component;

at least one client component; and a type driven interface for communication between the at least one manager component and the at least one client component, the type driven interface including one or more type definitions, the one or more type definitions including a first callback function and a second callback function, and wherein the at least one client component registers the first and second callback functions with the manager component.

2. The wagering game machine system of claim 1, wherein the one or more type definitions include a callback function return type definition.

3. A method comprising:

executing, by at least one processor, instructions stored on a non-transitory computer-readable storage medium, the at least one processor executing the instructions to perform operations comprising:

providing a wagering game framework for use in presenting a wagering game upon which monetary value may be wagered, the wagering game framework including a manager component;

providing at least one type definition by a client component, the type at least one type definition including a first callback function;

registering, by the client component, the first callback function with the manager component of the wagering game framework; and registering a second callback function of the at least one type definition with the manager component.

4. The method of claim 3, wherein the type definition includes a return type of the first callback function.

5. The method of claim 3, wherein registering the first callback function includes determining, based on the type definition, an entry in a handler data structure having a plurality of entries.

6. The method of claim 3, further comprising executing the first callback function in accordance with a message type.

7. The method of claim 6, wherein executing the callback function includes determining, based on the type definition, an entry in a handler data structure having a plurality of entries.

8. The method of claim 3, wherein registering the second callback function includes:

determining, based on the type definition, an entry in a handler data structure having a plurality of entries; and replacing the first callback function in the entry with the second callback function.

9. The method of claim 3, further comprising receiving the client component from a server.

10. A non-transitory computer-readable storage medium having computer executable instructions that when executed by at least one processor perform a method comprising:

providing a wagering game framework for use in presenting a wagering game upon which monetary value may be wagered, the wagering game framework including a manager component;

providing at least one type definition by a client component, the type definition including a first callback function;

registering, by the client component, the first callback function with the manager component of the wagering game framework; and registering a second callback function of the type definition.

11. The non-transitory computer-readable storage medium of claim 10, wherein the type definition includes a return type of the first callback function.

12. The non-transitory computer-readable storage medium of claim 10, wherein registering the first callback function includes determining, based on the type definition, an entry in a handler data structure having a plurality of entries.

13. The non-transitory computer-readable storage medium of claim 10, further comprising executing the first callback function in accordance with a message type.

14. The non-transitory computer-readable storage medium of claim 13, wherein executing the callback function includes determining, based on the type definition, an entry in a handler data structure having a plurality of entries.

15. The non-transitory computer-readable storage medium of claim 10, wherein registering the second callback function includes:

determining, based on the type definition, an entry in a handler data structure having a plurality of entries; and replacing the first callback function in the entry with the second callback function.

* * * * *